US011891256B2

(12) United States Patent
Taketsugu et al.

(10) Patent No.: US 11,891,256 B2
(45) Date of Patent: Feb. 6, 2024

(54) RECORDING APPARATUS

(71) Applicant: SEIKO EPSON CORPORATION, Tokyo (JP)

(72) Inventors: Eiji Taketsugu, Matsumoto (JP); Atsuhiko Takeuchi, Matsumoto (JP); Shun Ito, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 124 days.

(21) Appl. No.: 17/117,488

(22) Filed: Dec. 10, 2020

(65) Prior Publication Data

US 2021/0178780 A1 Jun. 17, 2021

(30) Foreign Application Priority Data

Dec. 13, 2019 (JP) ................................ 2019-225202

(51) Int. Cl.
*B65H 1/04* (2006.01)
*B41J 11/00* (2006.01)

(52) U.S. Cl.
CPC .............. *B65H 1/04* (2013.01); *B41J 11/007* (2013.01); *B65H 2403/61* (2013.01); *B65H 2405/1117* (2013.01); *B65H 2405/11151* (2013.01); *B65H 2601/521* (2013.01)

(58) Field of Classification Search
CPC ... B65H 1/00; B65H 1/04; B65H 1/26; B65H 3/0661; B65H 2301/4232; B65H 2301/42328; B65H 2402/44; B65H 2402/441; B65H 2402/45; B65H 2403/60; B65H 2403/61; B65H 2405/1115; B65H 2405/11151; B65H 2405/1117; B65H 2405/115; B65H 2405/3312; B65H 2407/21; B65H 2515/82; B65H 2601/521
See application file for complete search history.

(56) References Cited

U.S. PATENT DOCUMENTS

| | | | | |
|---|---|---|---|---|
| 9,709,948 | B2 * | 7/2017 | Wakimoto | G03G 21/1633 |
| 2005/0127593 | A1 * | 6/2005 | Kinsley | B41J 29/12 271/162 |
| 2016/0159588 | A1 * | 6/2016 | Mizuguchi | G03G 21/1633 271/147 |
| 2016/0363905 | A1 | 12/2016 | Wakimoto | |
| 2017/0283194 | A1 * | 10/2017 | Nakagawa | G03G 15/6514 |
| 2020/0024094 | A1 * | 1/2020 | Hanamoto | B65H 23/048 |
| 2021/0070563 | A1 * | 3/2021 | Nozawa | B65H 1/14 |

FOREIGN PATENT DOCUMENTS

| | | |
|---|---|---|
| JP | 2008-023838 | 2/2008 |
| JP | 2010008872 A * | 1/2010 |
| JP | 2017-003892 | 1/2017 |

* cited by examiner

*Primary Examiner* — Prasad V Gokhale
(74) *Attorney, Agent, or Firm* — WORKMAN NYDEGGER

(57) ABSTRACT

A recording apparatus includes a housing having a feeding port through which a medium is introduced into the housing, a feeding tray for supporting the medium fed through the feeding port, and a rotary damper configured to generate torque, in which the feeding tray includes a rotation shaft about which the feeding tray is rotatable, relative to the housing, between a close position at which the feeding tray holds the feeding port in a close state and an open position at which the feeding tray holds the feeding port in an open state, and the rotation shaft and the rotary damper are interlocked with each other.

2 Claims, 4 Drawing Sheets

RECORDING APPARATUS

The present application is based on, and claims priority from JP Application Serial Number 2019-225202, filed Dec. 13, 2019, the disclosure of which is hereby incorporated by reference herein in its entirety.

BACKGROUND

1. Technical Field

The present disclosure relates to a recording apparatus.

2. Related Art

In the related art, a recording apparatus is known, which includes a medium support unit configured to open and close a supply port through which a medium is supplied toward an inside of a housing, as described in JP 2008-23838 A.

Unfortunately, in the recording apparatus described above, when the medium support unit moves from an open state where the medium support unit opens the supply port to a close state where the medium support unit closes the supply port, the medium support unit moves, accelerated by its own weight, to collide with the housing. The sound generated at the time of the collision is comparatively loud, which made it difficult to achieve the satisfaction of a user.

SUMMARY

A recording apparatus includes a housing having a feeding port through which a medium is introduced into the housing, a feeding tray for supporting the medium fed through the feeding port, and a rotary damper configured to generate torque, in which the feeding tray includes a rotation shaft about which the feeding tray is rotatable, relative to the housing, between a close position at which the feeding tray holds the feeding port in a close state and an open position at which the feeding tray holds the feeding port in an open state, and the rotation shaft and the rotary damper are interlocked with each other.

DESCRIPTION OF EXEMPLARY EMBODIMENTS

Figure 1:
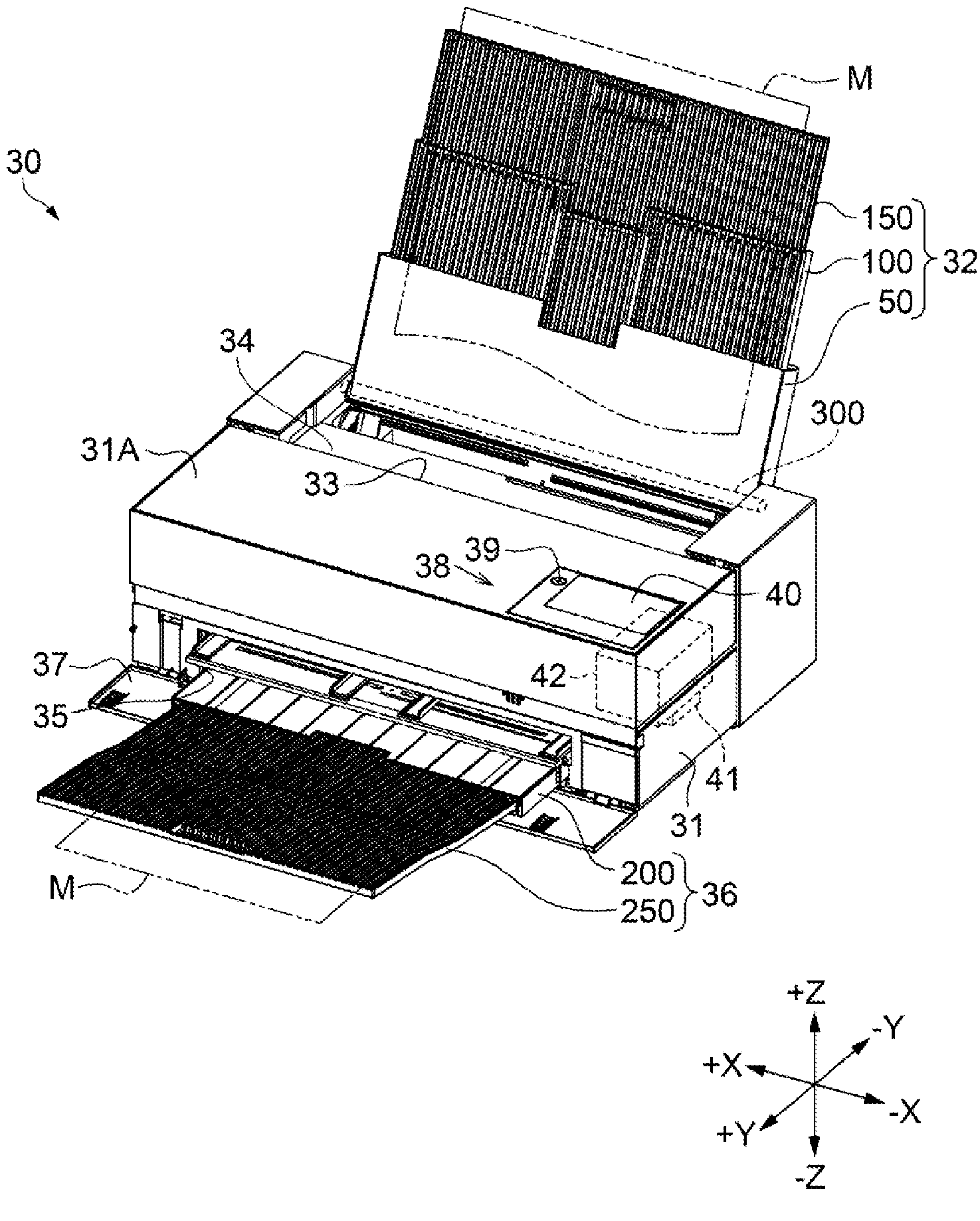
FIG. 1 is a perspective view illustrating a configuration of a recording apparatus.
Figure 2:
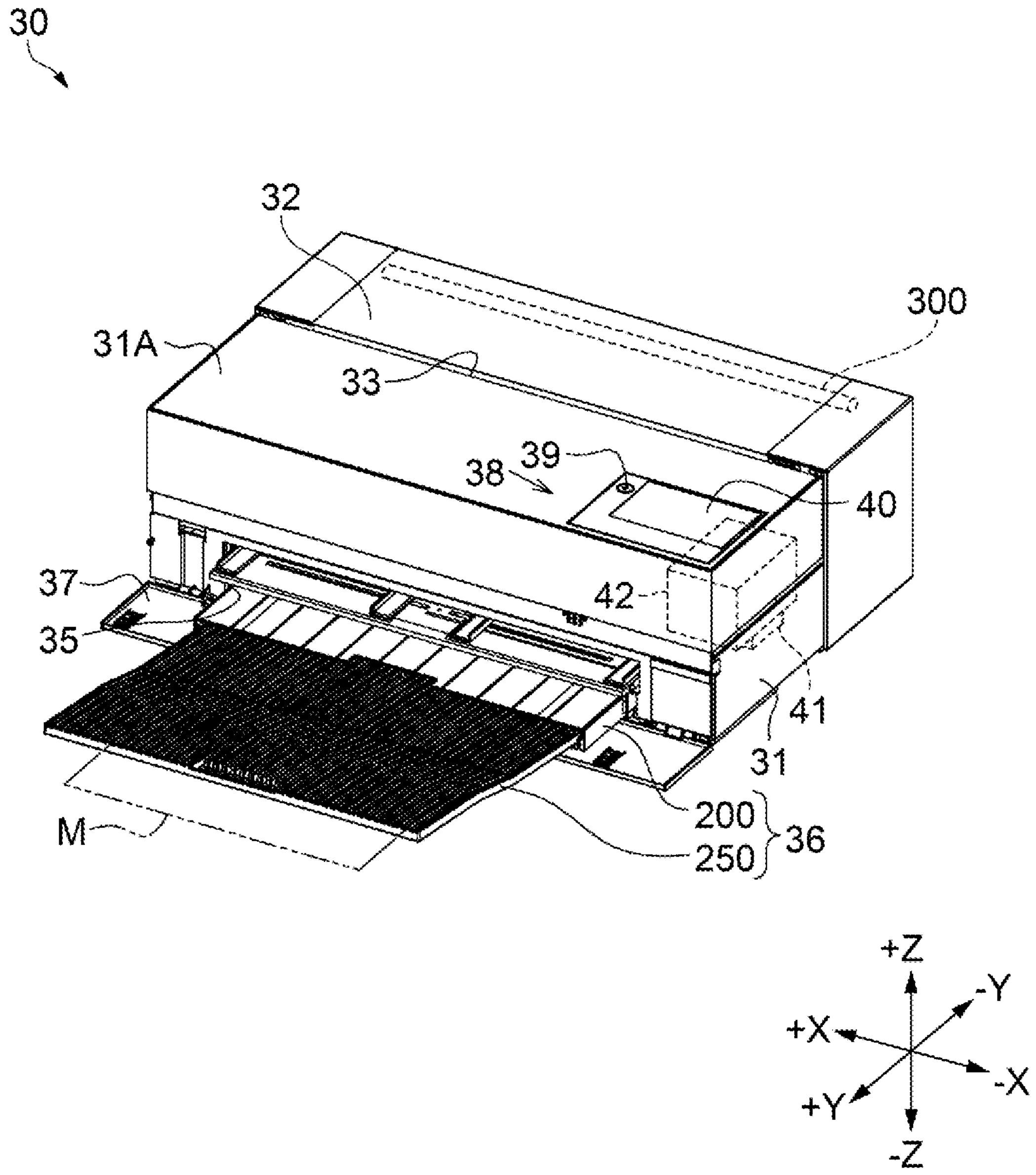
FIG. 2 is a cross-sectional view illustrating a configuration of a recording apparatus.

A recording apparatus 30 illustrated in FIGS. 1 and 2 serves as an inkjet printer of a serial printing type. The recording apparatus 30 includes a housing 31 of a substantially rectangular parallelepiped shape. An upper face 31A in a +Z direction of the housing 31 of the recording apparatus 30 is provided with a feeding tray 32 in which a user is allowed to set a medium M such as paper on which recording is to be performed. The medium M set in the feeding tray 32 is fed, through a feeding port 33, into the housing 31 of the recording apparatus 30. Note that FIG. 1 illustrates a state of an open position at which the feeding tray 32 holds the feeding port 33 in an open state where the feeding tray 32 opens the feeding port 33, and FIG. 2 illustrates a state of a close position at which the feeding tray 32 holds the feeding port 33 in a close state where the feeding tray 32 closes the feeding port.

The front in a +Y direction of the housing 31 of the recording apparatus 30 is provided with an ejection port 35 through which the medium M, on which recording has been performed by the recording apparatus 30, is ejected, and an ejection tray 36 in which the medium M on which the recording has been performed, ejected through the ejection port 35, is loaded. Note that a lower front face of the housing 31 of the recording apparatus 30 is provided with a cover 37 of an openable type, where the ejection tray 36 stored inside the housing 31 of the recording apparatus 30 is covered by the cover 37 that is closed.

In addition, the upper face 31A of the housing 31 of the recording apparatus 30 is provided with an operation panel 38. The operation panel 38 includes an operation unit 39 such as a power button, and a display unit 40 composed of a liquid crystal display and the like. The display unit 40 is configured to display a menu, various types of messages, and the like. The recording apparatus 30, which is communicably coupled to a host device (not illustrated), is configured to cause, when receiving recording data from the host device, a feeding mechanism (not illustrated) to feed the medium M set in the feeding tray 32, and to perform recording operation for recording an image based on the recording data on the medium M having been fed.

There is provided inside the housing 31 of the recording apparatus 30, a carriage 42 equipped with a recording head 41 configured to discharge a liquid such as ink or the like onto the medium M in a manner reciprocally movable along an X axis (a scanning direction) orthogonal to a transport direction in which the medium M is transported. The recording apparatus 30 is configured to alternately perform, in the course that the carriage 42 moves along the scanning direction, a recording operation that the recording head 41 discharges liquid droplets to perform recording for one pass, and a transport operation of transporting the medium M to the next recording position, to thus record an image or a document on the medium M.

At a front portion inside the housing 31 of the recording apparatus 30 and at one or both of portions on both sides sandwiching the ejection tray 36, there are provided mounting portions (both of them not illustrated in the figure) to which liquid containers such as an ink cartridge for storing a liquid such as ink used for the recording are detachably mounted. Note that, in this example, the liquid container is of an off-carriage type disposed at a position separate from the carriage 42, and the liquid container may also be of an on-carriage type that is detachably mounted on the carriage 42. Also, the recording apparatus 30 may include, without being limited to be of a serial recording type, the recording head 41 may be an elongated line head disposed across the entirety of the maximum width of the medium M, and of a line recording type configured to concurrently discharge liquid droplets onto the entirety of the width of the medium M.

The feeding tray 32 has a medium support structure of a three-stage structure that is constituted by a storage member 50, a first member 100, and a second member 150. The feeding tray 32 has a storage state where the storage member 50 stores the first member 100 and the second member 150, and a deployed state where the first member 100 and the second member 150 are drawn out from the storage member 50 by an operation of the user to allow the storage member 50, the first member 100, and the second member 150 to support the medium M. As illustrated in FIG. 1, the feeding tray 32 is set in the deployed state at the open position, and as illustrated in FIG. 2, the feeding tray 32 is set in the storage state at the close position.

The feeding tray 32 includes a rotation shaft 300 about which the feeding tray 32 is rotatably coupled to the housing 31 of the recording apparatus 30 between the open position and the close position. In addition, a rotation mechanism that the feeding tray 32 is configured to rotate relative to the housing 31 is provided with a gear damper 400 (see FIG. 3) as a rotary damper. The rotation mechanism including the gear damper 400 is a mechanism for reducing a movement speed of the feeding tray 32 when moving from the open position to the close position. Note that the rotation mechanism of the feeding tray 32 will be described later.

As illustrated in FIG. 2, the feeding tray 32 is disposed at the close position, at the time when being in the storage state, to hold the feeding port 33 in the close state, and becomes substantially flush with the upper face 31A of the housing 31 of the recording apparatus 30. The feeding tray 32, when being located at the close position, is provided at the housing 31, and is held in a state of being in contact with a support plate 34 (see FIG. 1) located in a −Z direction of the upper face 31A. As illustrated in FIG. 1, the feeding tray 32 is disposed at the open position to hold the feeding port 33 in the open state.

The ejection tray 36 is a portion at which the medium M on which the recording has been performed is disposed. The ejection tray 36 has a medium support structure of a two-stage structure that is constituted by an ejection-side first member 200 and an ejection-side second member 250.

The ejection tray 36 has a storage state where the ejection-side first member 200 stores the ejection-side second member 250, and a deployed state where the ejection-side second member 250 is drawn out from the ejection-side first member 200 to allow the ejection-side first member 200 and the ejection-side second member 250 to support the medium M. The ejection tray 36 is stored in the housing 31 of the recording apparatus 30 in the storage state. The ejection-side first member 200 is coupled, in a manner being drawable frontward, to the housing 31 of the recording apparatus 30. The ejection tray 36, when the ejection-side first member 200 and the ejection-side second member 250 are drawn out from the housing 31 of the recording apparatus 30 at the time when the ejection port 35 formed at the housing 31 of the recording apparatus 30 is in the open state, transitions to the deployed state.

Next, the rotation mechanism of the feeding tray 32 will be described.

Figure 3:
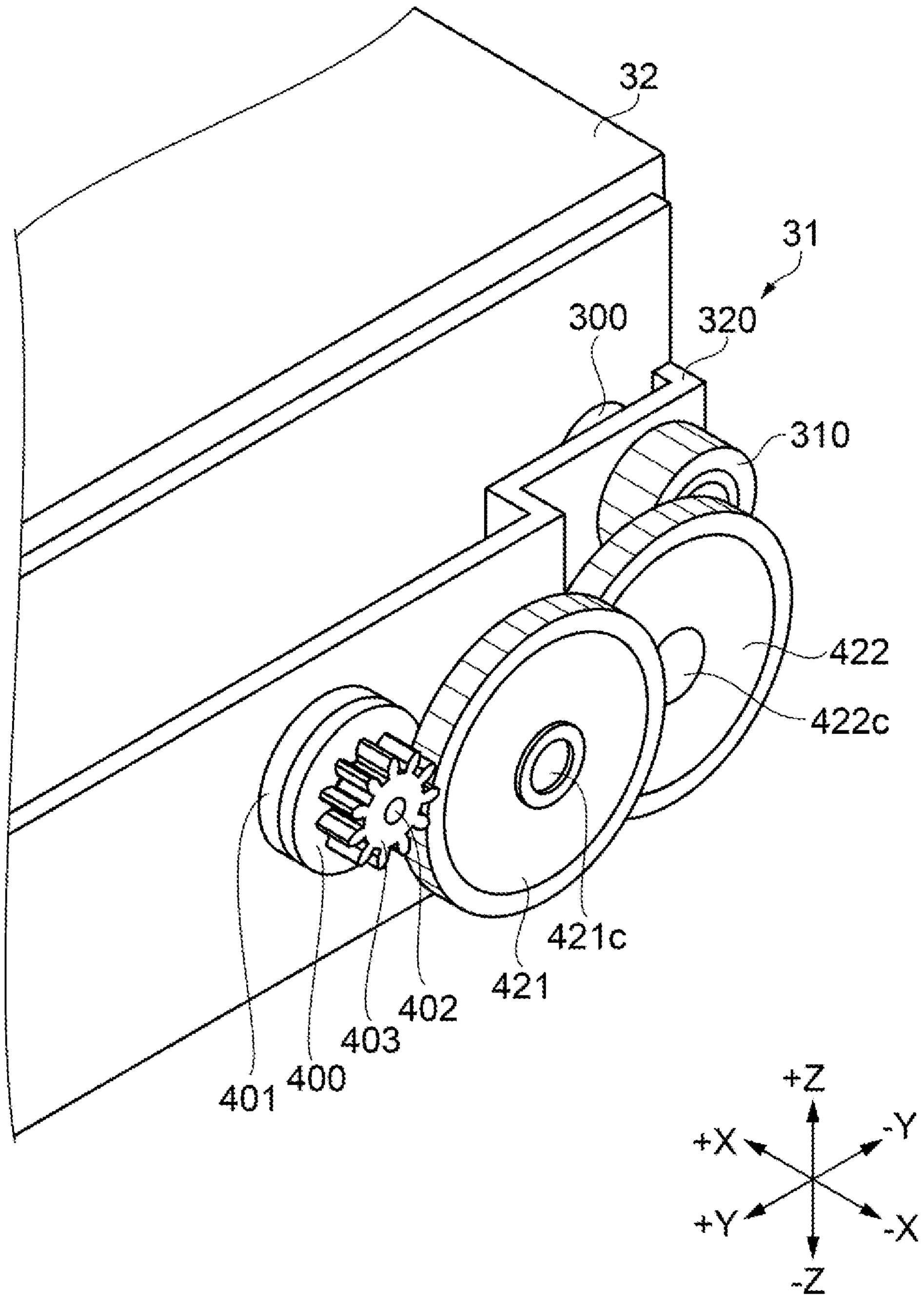
FIG. 3 is a perspective view illustrating a configuration of a rotation mechanism of a feeding tray.
Figure 4:
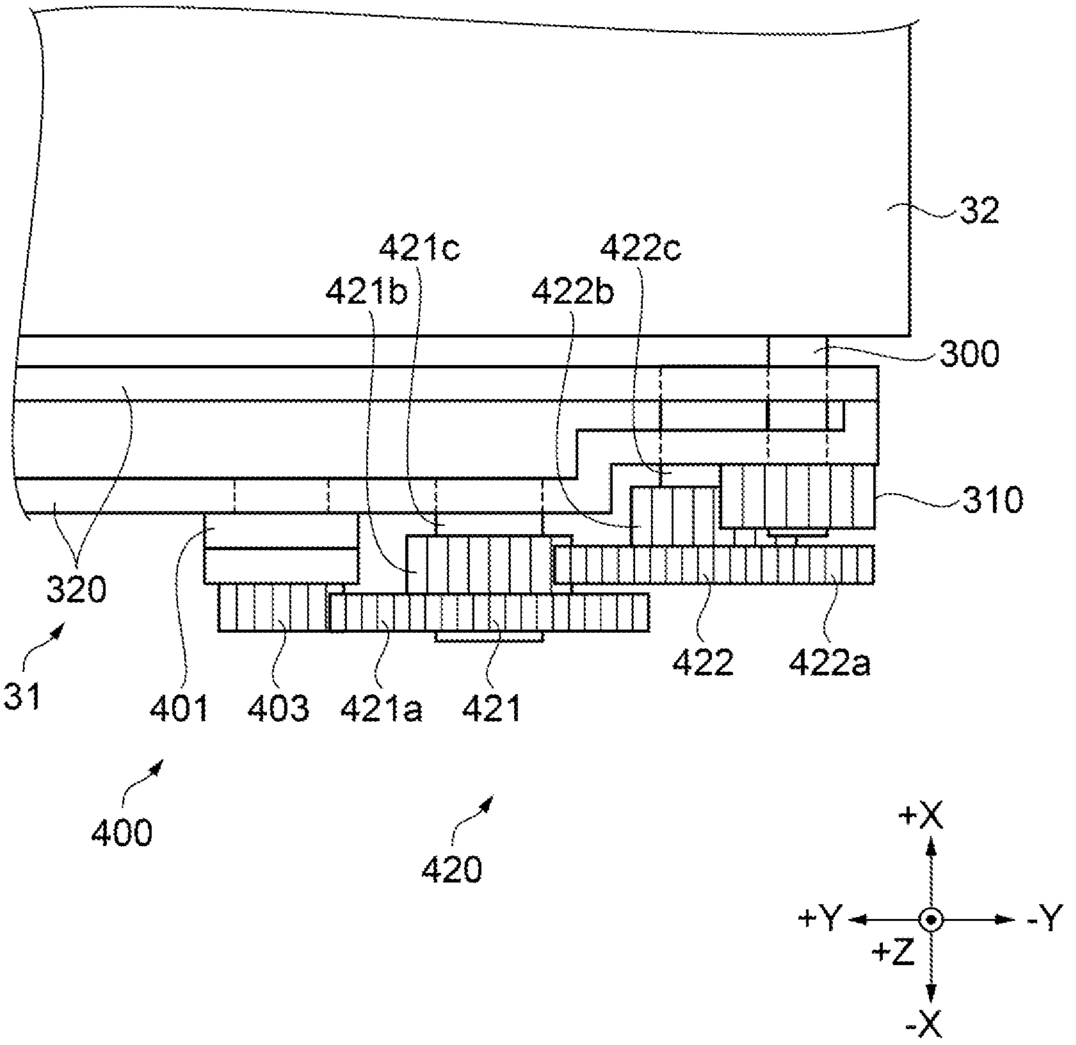
FIG. 4 is a plan view illustrating a configuration of a rotation mechanism of a feeding tray.

As illustrated in FIGS. 3 and 4, the storage member 50 of the feeding tray 32 is provided with the rotation shaft 300 extending in an X axis direction. The rotation shaft 300 is disposed corresponding to a side of an end portion in a −Y direction of the housing 31 of the storage member 50. The rotation shaft 300 is fixed to the storage member 50. That is, the feeding tray 32 including the storage member 50 is also configured to rotationally move in conjunction with the rotational movement of the rotation shaft 300.

One end portion of the rotation shaft 300 is rotatably supported by a bearing portion (not illustrated) provided at the housing 31. The other end portion of the rotation shaft 300 is provided with a first gear 310. The first gear 310 is fixed to the rotation shaft 300.

In addition, the gear damper 400 is installed at an internal frame 320 of the housing 31. The gear damper 400 is disposed in the +Y direction of the first gear 310. The gear damper 400 includes a main body 401 configured to generate torque, a shaft portion 402 coupled to the main body 401, and a gear portion 403 coupled to the shaft portion 402. The gear damper 400 is configured to generate constant torque in a rotation direction of the gear portion 403 rotating about the shaft portion 402. The torque generated by the gear damper 400 is a damping force. Note that a mechanism for generating torque at the gear damper 400 is not particularly limited, and may be of a hydraulic type or a spring type, for example.

The rotation mechanism of the feeding tray 32 has a configuration in which the rotation shaft 300 installed at the feeding tray 32 interlocks, via the first gear 310, with the gear damper 400 installed at the housing 31. This allows the torque generated from the gear damper 400 to be transmitted to the first gear 310, thus reducing the movement speed of the feeding tray 32 when being moved from the open position to the close position.

That is, in a configuration in which both end portions of the rotation shaft 300 provided at the feeding tray 32 are supported by the bearing portion at the housing 31, the feeding tray 32 moves, accelerated by its own weight, to collide with the housing 31, when the feeding tray 32 is moved from the open state to the close state. Further, a collision sound generated at the time of the collision is comparatively loud, which makes it difficult to achieve the satisfaction of the user. Under such a circumstance, the embodiment employs the configuration for making the first gear 310 interlock with the gear damper 400, to enable the feeding tray 32 to move at a slower speed than the movement speed of the feeding tray 32 moving under its own weight. This makes it possible to reduce the sound generated when the feeding tray 32 makes contact with the housing 31, which enhances the satisfaction of the user.

Note that, in the rotation mechanism of the feeding tray 32 of the embodiment, a gear train 420 is disposed between the first gear 310 provided at the rotation shaft 300 and the gear damper 400. The gear train 420 of the embodiment is constituted by two-stage gears 421 and 422. The two-stage gears 421 and 422 are installed at the internal frame 320. The two-stage gears 421 and 422 are configured to rotate about shafts 421*c* and 422*c*, respectively. The two-stage gear 421 is disposed in the +Y direction of the two-stage gear 422. The two-stage gears 421 and 422 are constituted by gears 421*a* and 422*a*, and gears 421*b* and 422*b* having a smaller gear diameter than the gears 421*a* and 422*a*, respectively.

Further, the gear damper 400 meshes with the gear 421*a* of the two-stage gear 421, the gear 421*b* of the two-stage gear 421 meshes with the gear 422*a* of the two-stage gear 422, and the gear 422*b* of the two-stage gear 422 meshes with the first gear 310. This allows the first gear 310 to interlock with the gear damper 400. The gear damper 400, the gears 421*a* and 422*a*, the gears 421*b* and 422*b*, and the first gear 310 are spur gears. Note that in FIGS. 3 and 4, the gears 421*a* and 422*a*, the gears 421*b* and 422*b*, and the first gear 310 are displayed with tip end portions of these gears being omitted. Note that an amount of torque that is transmitted from the gear damper 400 to the first gear 310 can be appropriately adjusted by setting the number, gear ratios, and the like of the gears that constitute the gear train 420.

Also, the two-stage gears 421 and 422 that constitute the first gear 310 and the gear train 420 are formed of a metal material. For example, sintered metal formed of a metal powder sintered at a temperature around the melting point of the metal powder is used. This makes it possible to enhance the durability compared to a configuration using a plastic material, for example.

As described above, according to the embodiment, an amplified torque is transmitted via the gear train 420 to the first gear 310, thus, the movement speed of the feeding tray 32 when being moved from the open position to the close position can be further reduced. This makes it possible to reduce the sound generated when closing the feeding tray 32 to make contact with the support plate 34, which enhances the satisfaction of the user. In addition, the feeding tray 32 moves slowly from the open position to the close position, to thus achieve a high-class feeling.

Further, the provision of the gear train 420 enables a sufficient torque to be transmitted to the first gear 310 even when employing the gear damper 400 having a compact size. This makes it possible to miniaturize the recording apparatus 30, conserving the space inside the housing 31.

Also, the movement speed of the feeding tray 32 can be reduced even if letting go of the grip of the feeding tray 32 at a midway position between the close position and the open position of the feeding tray 32.

Note that when the feeding tray 32 is caused to move from the close position to the open position with gripping the feeding tray 32, the torque generated between the first gear 310 and the gear damper 400 enables to achieve a moderate texture.

Note that, in the embodiment, the first gear 310 provided at the rotation shaft 300 is configured, but not limited to, to interlock with the gear damper 400 provided at the housing 31. For example, a configuration may also be employed in which the feeding tray 32 is provided with the gear damper 400 to cause the rotation shaft 300 to interlock with the gear damper 400. This allows the torque generated from the gear damper 400 to be transmitted to the rotation shaft 300, thus reducing the movement speed of the feeding tray 32 when being moved from the open position to the close position. This also makes it possible to simplify the configuration.

Further, in the embodiment, the rotation mechanism of the feeding tray 32 is provided only at the other end side of the rotation shaft 300, however, without being limited to this, the rotation mechanism of the feeding tray 32 may be provided at both ends of the rotation shaft 300, as necessary.

What is claimed is:

1. A recording apparatus, comprising:

a housing having a feeding port through which a medium is introduced into the housing;

a feeding tray for supporting the medium fed through the feeding port; and a rotary damper configured to generate torque, wherein the feeding tray includes a rotation shaft about which the feeding tray is rotatable, relative to the housing, between a close position at which the feeding tray holds the feeding port in a close state and an open position at which the feeding tray holds the feeding port in an open state, the rotation shaft and the rotary damper are interlocked with each other, and the rotary damper is installed at an internal frame of the housing with a gear train extending between a rotary damper main body that is configured to generate the torque and a first gear of the rotation shaft, the first gear interlocks with the gear train, the rotary damper main body and the first gear overlap in a direction in which the gear train extends from the first gear towards the rotary damper main body, the internal frame comprising a recessed portion and a non-recessed portion, the recessed portion is recessed inwardly towards the feeding tray that is at least partially surrounded by the internal frame and extends in the direction in which the gear train extends from the first gear towards the rotary damper main body, the rotary damper extends from an outer surface of the non-recessed portion, the first gear being disposed within the recessed portion, and a portion of a stage gear forming part of the gear train is disposed within the recessed portion and closer to the rotary damper main body than the first gear in the direction in which the gear train extends from the first gear towards the rotary damper main body.

2. The recording apparatus according to claim 1, wherein the first gear and the gear train are formed of a metal material.

* * * * *